(12) United States Patent
Gronow et al.

(10) Patent No.: US 8,775,417 B2
(45) Date of Patent: Jul. 8, 2014

(54) METHOD, SYSTEM AND CONTROLLER FOR SEARCHING A DATABASE

(75) Inventors: Brett James Gronow, Fitzroy (AU);
Keith David Deverell, Collingwood (AU); Jonathan David Pak, Fitzroy North (AU); Christopher Glendon Bates, Box Hill North (AU); David Peter Wolf, Northcote (AU)

(73) Assignee: Someones Group Intellectual Property Holdings PTY LTD ACN 131 335 325 (AU)

( * ) Notice: Subject to any disclaimer, the term of this patent is extended or adjusted under 35 U.S.C. 154(b) by 160 days.

(21) Appl. No.: 13/389,007

(22) PCT Filed: Aug. 10, 2010

(86) PCT No.: PCT/AU2010/001014
§ 371 (c)(1),
(2), (4) Date: Feb. 6, 2012

(87) PCT Pub. No.: WO2011/017746
PCT Pub. Date: Feb. 17, 2011

(65) Prior Publication Data
US 2012/0143857 A1     Jun. 7, 2012

(30) Foreign Application Priority Data
Aug. 11, 2009 (AU) .............................. 2009903736

(51) Int. Cl.
*G06F 7/00* (2006.01)
*G06F 17/30* (2006.01)

(52) U.S. Cl.
USPC ..................... 707/723; 707/706; 707/724

(58) Field of Classification Search
USPC ........................................ 707/723, 724, 706
See application file for complete search history.

(56) References Cited

U.S. PATENT DOCUMENTS 5,513,277 A * 4/1996 Huttenlocher ................ 382/171
5,751,286 A * 5/1998 Barber et al. ................. 715/835
(Continued)

FOREIGN PATENT DOCUMENTS

GB     EP1302865 A1     4/2003

OTHER PUBLICATIONS

Sclaroff et al., "ImageRover: a content-based image browser for the World Wide Web", Jun. 1997, Content-Based Access of Image and Video Libraries, pp. 2-9.*

(Continued)

*Primary Examiner* — Apu Mofiz
*Assistant Examiner* — Jared Bibbee
(74) *Attorney, Agent, or Firm* — Katten Muchin Rosenman LLP

(57) ABSTRACT

A database searching system, method and controller is provided for interactively searching a database of data items in a descriptor space with a user, comprising a display for viewing by the user; a position selector for manipulation and activation by the user; a reference set selector for selecting a reference set (64a-64d) of two or more data items; a reference set coordinate obtainer for obtaining descriptor coordinates for each of the reference data items; a search results identifier for identifying a search results set of data items in the database which are close to or between one or more members of the reference set in the descriptor space; and a search results display controller for displaying the search results set on the display so that closeness on the display between particular data items is generally indicative of closeness in the descriptor space.

24 Claims, 3 Drawing Sheets

(56) References Cited

U.S. PATENT DOCUMENTS

| | | | |
|---|---|---|---|
| 5,983,237 A * | 11/1999 | Jain et al. ............................. | 1/1 |
| 6,035,323 A * | 3/2000 | Narayen et al. ............... | 709/201 |
| 6,121,963 A * | 9/2000 | Ange ............................ | 715/202 |
| 6,240,423 B1 * | 5/2001 | Hirata ................................. | 1/1 |
| 6,415,282 B1 * | 7/2002 | Mukherjea et al. ........... | 707/737 |
| 6,463,426 B1 * | 10/2002 | Lipson et al. ........................ | 1/1 |
| 7,788,258 B1 * | 8/2010 | Malpani et al. ............... | 707/724 |
| 2002/0095439 A1 * | 7/2002 | Long et al. ................... | 707/507 |
| 2003/0018631 A1 * | 1/2003 | Lipson et al. ...................... | 707/3 |
| 2003/0039410 A1 * | 2/2003 | Beeman et al. ............... | 382/305 |
| 2003/0110163 A1 | 6/2003 | Chen et al. | |
| 2004/0250205 A1 * | 12/2004 | Conning ....................... | 715/517 |
| 2005/0004897 A1 * | 1/2005 | Lipson et al. ...................... | 707/3 |
| 2005/0149473 A1 * | 7/2005 | Weare ............................... | 707/1 |
| 2005/0210414 A1 * | 9/2005 | Angiulo et al. ................ | 715/838 |
| 2006/0190445 A1 * | 8/2006 | Risberg et al. ..................... | 707/3 |
| 2007/0269139 A1 * | 11/2007 | Erol et al. ..................... | 382/305 |
| 2008/0215548 A1 * | 9/2008 | Ohashi et al. ..................... | 707/3 |
| 2010/0223258 A1 * | 9/2010 | Ghahramani et al. ......... | 707/723 |
| 2013/0215116 A1 * | 8/2013 | Siddique et al. .............. | 345/420 |
| 2013/0273968 A1 * | 10/2013 | Rhoads et al. .............. | 455/556.1 |

OTHER PUBLICATIONS

John R. Smith and Shih-Fu Chang, "VisualSEEK: a fully automated content-based image query system", 2004, pp. 87-98.*

Australian Patent Office, International Search Report and Written Opinion on PCT/AU2010/001014, Nov. 16, 2010, Woden Act 2606, Australia.

* cited by examiner

METHOD, SYSTEM AND CONTROLLER FOR SEARCHING A DATABASE

FIELD

The present invention relates to a computerized method, system and controller for searching a database of data items, particularly but not limited to media items such as images, music, movies, games or books.

BACKGROUND TO THE INVENTION

Searching through databases of media items such as stock photographs is a task often undertaken both in the media industry and by consumers generally. Websites such as gettyimages.com images.google.com and others typically provide searching methods that involve descriptor based indexing of image content. The content descriptors typically relate to aspects such as concept, emotion, location or to the characteristics of people in the image. The user specifies values of one or more content descriptors typically using checkboxes in drop-down lists and the image search engine then searches the image database index for images matching the user-specified values. Matching images are then typically displayed, accompanied with technical information such as resolution or origin, in a scrollable window. Usually a first page shows the closest matches, which may involve some assessment of additional native properties such as colour balance, and multiple further pages contain less close matches. The user inspects the many images and may refine the search by specifying further content descriptor values, or by choosing one reference image as an example.

Although an initial search using descriptors produces many potentially relevant images, refinement of the search to select out images of more interest is often frustrating. Further, the need to scroll through and individually examine a mixture of a large number of images and text is tiring and tedious.

There is therefore a need to provide improved database searching techniques that enable more efficient and user-friendly identification of useful data items, with particular application to media.

The inventors of the current invention have found a much improved method of assisting the user to locate a data item of interest, by making advances in the use of reference data items and ordered and manageable display of search results.

SUMMARY OF THE INVENTION

According to a first aspect of the invention there is provided a method of searching, with a user via a user interface, a database containing data items in a descriptor space, comprising the steps of
  selecting a reference set of two or more reference data items;
  obtaining descriptor coordinates for each of the reference data items;
  identifying a search results set of data items in the database which are close to or between one or more members of the reference set in the descriptor space; and
  displaying the search results set on the display so that closeness on the display between particular data items is generally indicative of closeness in the descriptor space.

In one embodiment, the method further comprises displaying the reference set with the search results set on the display. One or more of the reference data items may be selected by the user dragging the corresponding data items to one of a set of corresponding reference locations. The search set and the reference set may be displayed in a display pane at edges or corners of the display pane.

In one embodiment, one or more of the reference data items are selected by automatic selection from the database. The automatic selection may involve a random element.

In one embodiment, the search set data items and reference set data items are displayed so that the position of each data item on the display generally reflects a position of the data item in the multi-dimensional descriptor space.

In one embodiment, the data items are displayed in a defined grid of corresponding locations and the step of identifying each search set data item comprises
  computing a weight for each reference data item as a function of relative distance on the display between the reference data item location and the search data item locations;
  using the weights to compute a target position in the descriptor space as a weighted average of the descriptor coordinates of the reference set; and
  identifying the search set data item as the closest data item in the database to the target position.

The function for computing the weight for each reference data item may be the same for each reference data item and may be the inverse square of the relative distance.

In one embodiment, the data items comprise digital media which may be images and/or audio.

In one embodiment, one or more of the reference data items is selected by the user from outside the database.

In one embodiment, the method further comprises receiving a restriction criterion from the user and wherein the step of identifying the search results set further comprises restricting the search results set to data items that satisfy or are close to the restriction criterion.

According to a second aspect of the invention there is provided a database searching system for interactively searching a database of data items in a descriptor space with a user, comprising
  a display for viewing by the user;
  a position selector for manipulation and activation by the user;
  a reference set selector for selecting a reference set of two or more data items;
  a reference set coordinate obtainer for obtaining descriptor coordinates for each of the reference data items;
  a search results identifier for identifying a search results set a data items in the database which are close to or between one or more members of the reference set in the descriptor space; and
  a search results display controller for displaying the search results set on the display so that closeness on the display between particular data items is generally indicative of closeness in the descriptor space.

According to a third aspect of the invention there is provided a database searching controller for interactively searching a database of data items in a descriptor space with a user viewing a display and having a position selector for manipulation and activation, comprising:
  a reference set selector for selecting a reference set of two or more data items;
  a reference set coordinate obtainer for obtaining descriptor coordinates for each of the reference data items;
  a search results identifier for identifying a Search results set a data items in the database which are close to or between one or more members of the reference set in the descriptor space; and a search results display controller for displaying the search
results set on the display so that closeness on the display
between particular data items is generally indicative of
closeness in the descriptor space.

According to a fourth aspect of the invention there is provided computer program code when executed by a computer causes the computer to implement any of the embodiments of the method of searching of the first aspect of the invention.

According to a fifth aspect of the invention there is provided a computer readable medium comprising the program code of the fourth aspect of the invention.

According to a sixth aspect of the invention there is provided a data signal comprising the computer program code of the fourth aspect of the invention.

DETAILED DESCRIPTION OF EMBODIMENTS

Figure 1:
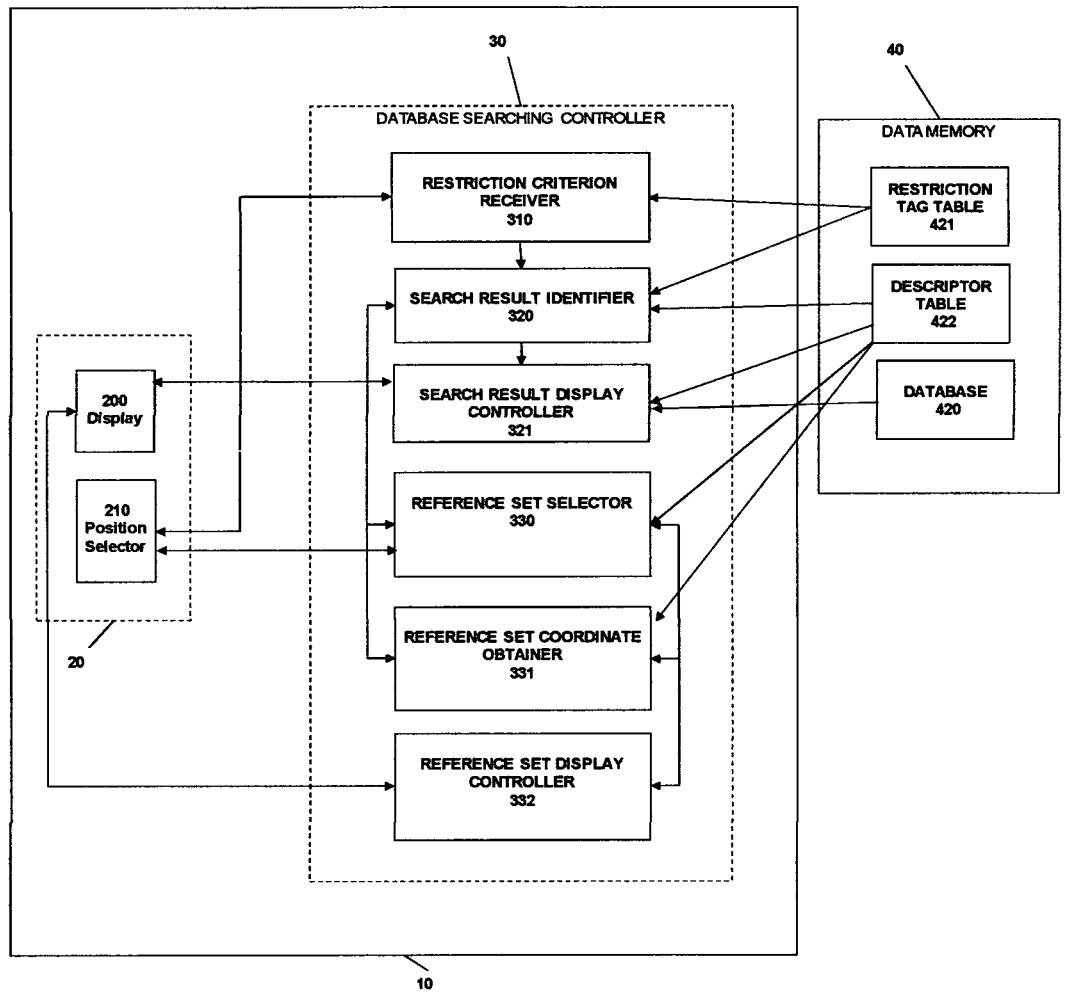
FIG. 1 is a block diagram of an example image searching system of the current invention.

Referring to the drawings, there is shown various aspects of a database searching system, controller and method according to the invention.

The system may take a number of different forms. In a first form, a standalone system is provided wherein all or most components required are present in a local user operable computer and interface.

In a second form, a distributed architecture is provided wherein some of the components required for implementing the system are present in local user operable computer and interface and some of the components are located remotely relative to the user. For example, a "thick client" architecture may be used wherein part of the search and/or display control is executed on a local user operable computer and interface and part is executed remotely, such as by a server; or a "thin client" architecture may be used wherein most of the search and display control is executed remotely such as by a server and a local machine is used only for the user interface.

A typical web-based implementation involves a conventional personal computer with display, keyboard and mouse or touch sensitive screen, implementing the database searching controller as a JavaScript or XML program which may be downloaded from a website. The database will typically be stored remotely from the user and be interrogated by the database searching controller.

Referring now to FIG. 1, the core components at the broadest level are the database searching system 10 comprising a user interface 20 and an database searching controller 30, communicating with a data memory 40 which may be located both locally and remotely. In one embodiment data memory 40 includes a database 420, descriptor table 422 and restriction tag table 421.

Components of the user interface 20 include a display 200 such as an LCD monitor and a position selector 210 such as a mouse for the user to indicate a position on the display 200 with at least one selector button such as a left or right mouse button to enable the user to select the position and perform other input functions.

The database searching controller 30 is in data communication with the user interface 20 and data memory 40 and typically contains or is implemented on a processor that processes the search in accordance with user input and outputs on display 200. Herein the term "processor" is used to refer generically to any device that can perform this function and may include: a microprocessor, microcontroller, programmable logic device or other computational device, a general purpose computer (e.g. a PC) or a server.

For media applications, database 420 is a large database of media items, accompanied as is standard in the art by a restriction tag table 421 typically containing textual or binary content-based information in relation to each media item, but may also contain some native media information such as media type (e.g. colour/B&W). Data memory 40 also contains descriptor table 422 of derived descriptors for each media item as described herein which typically originate from native audiovisual descriptors but may also originate from content-based information. Tables 421 and 422 are computed during a database build and may be remotely located from media item database 420, particularly in the case where the invention is being exercised by a party other that the database owner. Tables 421 and 422 may be ordered or indexed in whole or part to speed identification of items in database 420 satisfying values or value ranges in the descriptors or restriction tags, as is known in the art.

Database searching controller 30 in some embodiments has a restriction criterion receiver 310 for receiving a restriction criterion from the user, search result identifier 320 for identifying a search results set of data items in the database 420 closely matching a set of reference data items and optionally the restriction criterion, a search result display controller 321 for displaying the search result on display 200, and reference set selector 330 for selecting two or more reference data items, either selected by the user via position selector 210 from inside or outside the database or generated by a random or otherwise automatic selection from the database 420. Reference set coordinate obtainer 331 is adapted to obtain descriptor coordinates a the retrace data items either from the descriptor table 422 or by direct computation from the data item. Reference set display controller 332 is adopted to display the reference set on the display.

Figure 2:
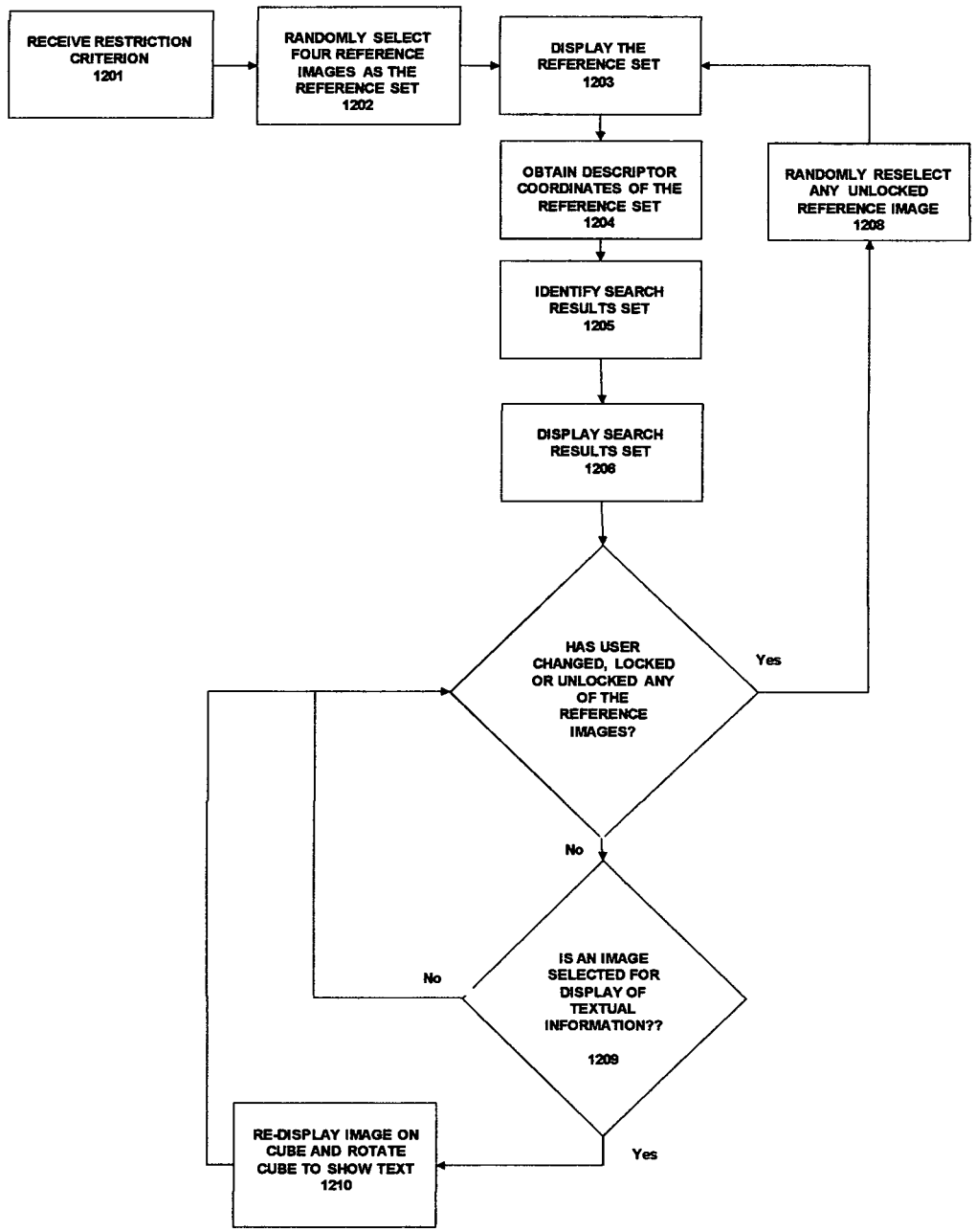
FIG. 2 shows a flow diagram for the method of image searching of an embodiment of the current invention.
Figure 3:
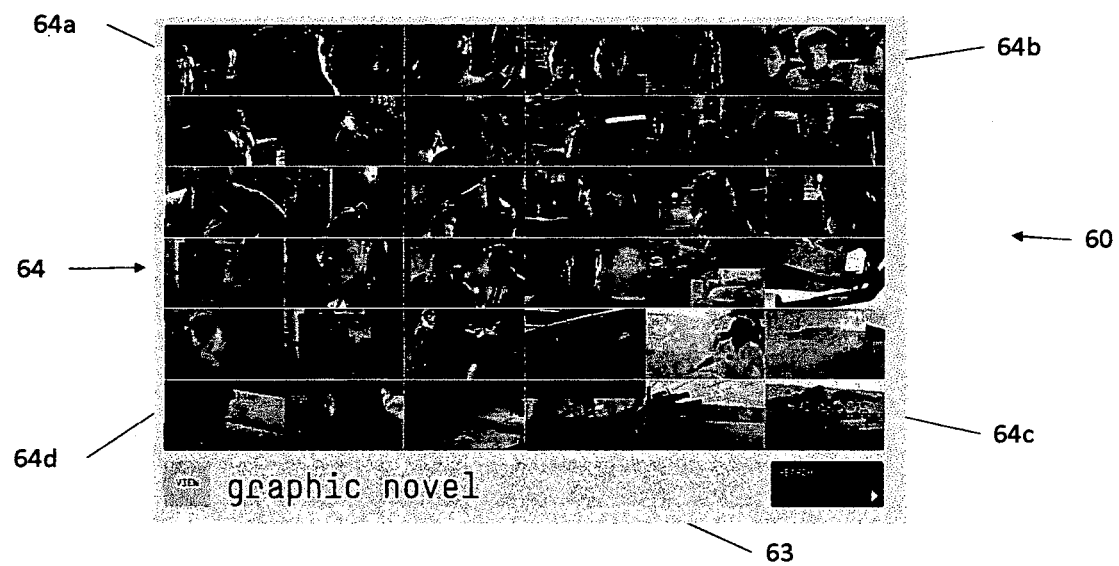
FIG. 3 shows on example screen layout for displaying a set of images according to the embodiment of FIG. 2.

Referring now to FIGS. 2 and 3, one embodiment of the method aspect of the invention is depicted in a flow diagram and an example display layout 60 is shown. In step 1201, the user types or otherwise selects in content window 63 a restriction criterion, typically a textual or content-related tag such as "graphic novel" shown in FIG. 3. In step 1202, a first reference set of four reference images satisfying the restriction criterion is automatically selected from the database. The automatic selection may involve a simple random selection, or random selection within a confined region of descriptor space. In step 1203, the reference images are displayed in corner positions 64a, 64b, 64c, and 64d of image display pane 64. In step 1204, the descriptor coordinates (further described below) of each reference image are obtained from the descriptor table 422. In step 1205 and 1206, a search results set is identified and displayed as further described below so that closeness on the display between data items is generally indicative of closeness in the descriptor space. In this embodiment the images are displayed in a two-dimensional closely-packed mosaic of images, and no additional textual information clutters the display of the images. In step 1207, the user then inspects the displayed images and may refine the search by locking one of the reference images. This may be done with position selector 210 by choosing one image of interest (which may originate from outside the system or may already be in the display pane) and dragging it to one of the reference locations, in this case one of the corners 64a to 64d. Locking may also be performed by double-clicking the position selector on the reference location, which will fix the existing image. If in step 1207 a change is made, unlocked reference images may be re-randomised in step 1208 and the steps of displaying, obtaining and identifying 1203-1206 repeated. The re-randomization may be simple random selection or random selection biased to a region in descriptor space indicated by the descriptor values of the locked reference images. Optionally the next search results set in step 1206 may be displayed in a duplicate pane to the right to enable the user to inspect the previous results set at the same time as the current search results on the display. Step 1207 also allows the user to unlock any of the reference images, by performing a single click on the relevant reference location.

In step 1208, the user may obtain specific textual information in relation to an image by selecting the image with the mouse and then clicking on a "info" button (not shown). The image is then re-displayed in situ as the front face of a cube, with textual information on different faces, such as owner, resolution, price etc. The user can use mouse movements to orient the cube and see the desired information. In a simpler version where as a small amount of information is needed to be available, a flat page can be used instead of a cube and the text can be revealed by flipping the page over with the mouse.

In this way a large amount of structured information can be accessed by the user without switching to a new window or disrupting the simple uncluttered display of images.

Example of Image Descriptor Space

There are many available image descriptors that can be used in the invention. Examples include colour histogram, SIFT edge detection, SURF edge detection, Canny edge detection, Tamura texture features, and Gabor texture features.

The inventors' currently implemented embodiment for images such as photographs or movie stills uses, for the multidimensional descriptor space, a reduced set of 35 descriptors derived during a database build using single value decomposition (SVD) of the 336 descriptors in the combination of the uncompressed CEDD [Ref 1] and FTCH [Ref 2] descriptor sets.

The step 1204 of obtaining descriptor coordinates for each of the reference data items entails, for images originating in the database, accessing the descriptor table 422. For images supplied by the user as reference images, the step emails computing the 35 descriptors from the image pixels.

Example of Identifying and Displaying Search Results

As described above, in step 1205 and 1206, a search results set is identified and displayed with the reference set so that closeness on the display between particular data items is generally indicative of closeness in the descriptor space. As can be seen in FIG. 3, there is a general gradation in image properties across the display and the four corners house the reference set. The method currently employed by the inventors to obtain the search results set is as follows. First, for each display position in the fixed grid, the distance to each reference data location (i.e. each corner) is computed. A weight is computed from the distance by taking the inverse square ("gravity model"). The four weights are then normalized to sum to unity. Next a target position in the descriptor space is computed as the weighted average of the descriptor coordinates of the reference set. Finally the database is searched for the data item having the most similar descriptor coordinates to the target position, as measured by Euclidean 35-dimensional distance. This data item is then displayed in the display position as a member of the search results set.

The above method has the advantage of simplicity and being able to be applied to any number of reference data items in any display locations. It will be appreciated that there are many other ways of achieving the same broad aim and the invention is not restricted to any particular method. An alternative example is the use of barycentric coordinates commonly used in computer graphics, which applies most easily to the case of three reference locations.

Example of Audio Descriptor Space

Examples of audio descriptors that can be used in the invention include Mel-Frequency Cepstrum, Zero-Crossings, Spectral Analysis, Spectral Centroid, Spectral Rolloff, Linear Predictive Coding Coefficients, and Beat Histograms.

The inventors' currently implemented embodiment for music and audio data items uses, for the multidimensional descriptor space, a combination of a large variety of the known audio descriptors, such as are implemented on jAudio descriptor computation software [Ref 3], found on the internet at http://jmir.sourceforge.net/jAudio.html. A large number of available descriptors (in this case 330) are first tested on the data set to remove any (typically about 30) that tend to cause errors in the SVD algorithm for certain data types. The robust remaining set (about 300) is then subjected to the SVD algorithm as in the image example to provide a reduced set of 35 descriptors.

Example of Audio Display

In the case of photographs, the nature of the item is apparent to the user in the display of the item. Clearly in the case of audio, adaptations are desirable in search result display controller 321 and reference set display controller 332 in the display of the audio items to convey some information on the nature of the audio, usually in addition to visual aspects such as the supplied music track artwork or album cover. One approach is to condense the descriptor coordinates further from 35 to 3 using SVD, and to represent the 3 condensed coordinates as RGB values in a colour space. The user will came to understand which colours correspond to which type of sounds.

Tag-based Descriptor Applications

Although in the above examples the database is built from descriptors that are calculated from the native audiovisual data, such as colour balance or edge information for images and time series descriptors in the case of music, it is possible to include content-based tags in the original descriptor set, which can also be condensed together with the native descriptors in the SVD algorithm.

Depending on the database and application there may also be situations where the reduced set of descriptors is calculated entirely from content-based descriptors. For example, when searching for a movie or more especially a book it may be found that information such as actors, director, author, plot, violence level etc is more useful in providing recommendations to the user than the native descriptors. There may also be a wide range of binary descriptors such as, in the case of video games, whether the game has action or strategy elements, puzzles, elves or guns. These content tags can all be treated the same way as the native disrupters and reduced to a multidimensional set of a manageable number of continuous coordinates using an algorithm such as SVD.

It will be appreciated that while single value decomposition from a large number of descriptors has been described as one method of providing a manageable descriptor space, the invention encompasses any descriptor space however produced. In particular, another clustering algorithm such as NIPALS could be used instead of SVD. Furthermore, the descriptor space is not restricted to Cartesian spaces, and may for example be a tree of nodes, the coordinates being any way of representing position in the tree, or any other structure of values for which a notion of closeness between values can be defined.

Persons skilled in the art will also appreciate that many variations may be made to the invention without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

REFERENCES

1. S. A. Chatzichristofis and Y. S. Boutalis, "CEDD: COLOR AND EDGE DIRECTIVITY DESCRIPTOR—A COMPACT DESCRIPTOR FOR IMAGE INDEXING AND RETRIEVAL.", <<6th International Conference in advanced research on Computer Vision Systems ICVS 2008>> Proceedings: Lecture Notes in Computer Science (LNCS) pp. 312-322, May 12 to May 15, 2008, Santorini, Greece
2. S. A. Chatzichristofis and Y. S. Boutalis, "FCTH: FUZZY COLOR AND TEXTURE HISTOGRAM—A LOW LEVEL FEATURE FOR ACCURATE IMAGE RETRIEVAL", <<9th International Workshop on Image Analysis for Multimedia Interactive Services", Proceedings: IEEE Computer Society pp. 191-196, May 7 to May 9, 2008, Klagenfurt, Austria
3. McEnnis, D., C. McKay, I. Fujinaga, and P. Depalle. 2005. jAudio: A feature extraction library *Proceedings of the International Conference on Music Information Retrieval.* 600-3.

The invention claimed is:

1. A method of searching, with a user via a user interface, a database containing data items in a descriptor space, the method comprising the steps of:
   selecting, via the user interface, a reference set of four reference images corresponding to four data items in the descriptor space;
   obtaining descriptor coordinates for each of the four reference data items;
   identifying a search results set of plural images corresponding to plural data items in the database which are close to one or more members of the reference set data items in the descriptor space; and
   displaying on a display (i) the four reference set images at respective four corners of the display, with distances therebetween, and (ii) the search results set plural images on the display between the four corners of the display, such that respective two-dimensional distances on the display between each of the four displayed reference set images and each of the plural displayed search results images corresponds to their respective closeness in the descriptor space.

2. The method as claimed in claim 1, wherein the displaying step includes the step of displaying another search results image between only two of the four corners of the display.

3. The method as claimed in claim 2, further comprising the step of enabling the user to select a reference data item by the user dragging an image corresponding to the reference data item to one of the four corners of the display.

4. The method as claimed in claim 1, further comprising the step of selecting one or more of the reference data items automatically from the database.

5. The method as claimed in claim 4, further comprising the step of using a random element for automatically selecting the one or more reference data items.

6. The method as claimed in claim 1, further comprising the step of creating a display pane when displaying the search results set images and the reference set images on the display.

7. The method as claimed in claim 1, further comprising the step of dragging a search results image to a corner of the display to create a new reference data set image.

8. The method as claimed in claim 1, further comprising the step of organizing the search results set images and the reference set images on the display so that a position of each search results set image on the display reflects the position of the corresponding search results set data item in the descriptor space.

9. The method as claimed in claim 1, further comprising the steps of:
   using a defined grid of corresponding locations for display of the reference data set images and the search results data set images; and
   wherein the step of identifying a search set data item comprises the steps of:
      computing a weight for each reference data item as a function of relative distance on the display between each of the corresponding locations for display of each of the reference data items and the each of the corresponding locations for display of each data item in the search results set of data items;
      using the weight to compute a target position in the descriptor space as a weighted average of the descriptor coordinates of each reference data item; and
      identifying the search set data item as closest in the database to the target position.

10. The method as claimed in claim 9, wherein the function for computing the weight for each reference data item is the same for each reference data item and is the inverse square of the relative distance.

11. The method as claimed in claim 1, wherein the reference data items and the search results set of data items comprise digital media.

12. The method as claimed in claim 11, wherein the digital media comprise images.

13. The method as claimed in claim 11, wherein the digital media comprise audio media.

14. The method as claimed in claim 1, further comprising the step of enabling the user to select from outside the database one or more of the reference data items.

15. The method as claimed in claim 1, further comprising the steps of:
   receiving a restriction criterion from the user; and
   restricting the search results set to data items that satisfy or are close to the restriction criterion.

16. A database searching system for interactively searching a database of data items in a descriptor space with a user, the database searching system comprising:
   a display for viewing by the user;
   a position selector for manipulation and activation by the user; and
   at least one processor configured to perform the functions of:
      a reference set selector for selecting a reference set of four reference images corresponding to four data items in the descriptor space;

a reference set coordinate obtainer for obtaining descriptor coordinates for each of the four reference data items;
a search results identifier for identifying a search results set of plural images corresponding to plural data items in the database which are close to one or more members of the reference set data items in the descriptor space; and
a search results display controller for displaying on a display (i) the four reference set images at respective four corners of the display, with distances therebetween, and (ii) the search results set plural images on the display, such that respective two-dimensional distances on the display between each of the four displayed reference set images and each of the plural displayed search results images corresponds to their respective closeness in the descriptor space.

17. A database searching controller for interactively searching a database of data items in a descriptor space with a user viewing a display and having a position selector for manipulation and activation, the database searching controller comprising at least one processor configured to perform the functions of:
a reference set selector for selecting a reference set of four reference images corresponding to four data items in the descriptor space;
a reference set coordinate obtainer for obtaining descriptor coordinates in a descriptor space for each of the reference data items;
a search results identifier for identifying a search results set of plural images corresponding to data items in the database which are close to or between one or more members of the reference set data items in the descriptor space; and
a search results display controller for displaying on the display (i) four reference set images at respective four corners of the display with distances therebetween, and (ii) the search results set of plural images on the display between the four corners of the display, such that respective two-dimensional distances on the display between each of the four displayed reference set images and each of the plural displayed search results images corresponds to their respective closeness in the descriptor space.

18. A image searching system as claimed in claim 16, further comprising a processor executing code stored in memory wherein at least one of the reference set selector, reference set display controller, reference set coordinate obtainer, search results identifier and search results display controller is implemented at least in part, by said processor executing said code stored in a memory.

19. A computer readable medium comprising non-transitory program code which, when executed by at least one processor performs the functions set forth in claim 1.

20. The method according to claim 1, wherein the descriptor space comprises one or more tables storing, for each of the search results set plural images, at least one color histogram.

21. The method according to claim 20, wherein the one or more descriptor tables store, for each of the plural images, at least one of SIFT edge detection, SURF edge detection, and Canny edge detection.

22. The method according to claim 21, wherein the one or more descriptor tables store, for each of the plural images, at least one of Tamura texture features and Gabor texture features.

23. The method according to claim 1, wherein the descriptor space comprises one or more tables storing, for each of the search results set plural images, at least one reduced set of descriptors derived by single value decomposition of multiple values in an uncompressed descriptor set.

24. A method of searching, with a user via a user interface, a database containing data items in a descriptor space, the method comprising the steps of:
selecting a reference set of two or more reference data items;
obtaining descriptor coordinates for each of the reference data items;
identifying a search results set of plural data items in the database which are close to one or more members of the reference set in the descriptor space; and
displaying on a display images corresponding to (i) the two or more reference data items with distance therebetween, and (ii) the search results set of data items on the display between the two or more reference data items, such that closeness on the display between each displayed reference data item and each displayed search results data item corresponds to their respective closeness in the descriptor space,
wherein the step of identifying the search results set includes the steps of:
providing a grid for the display;
for each display position in the grid, compute distances to each reference data item location;
for said each display position in the grid, compute a weight from each computed distance by taking an inverse square;
normalize the computed weights to sum to unity;
compute a target position in the descriptor space as the weighted average of descriptor coordinates for each reference set;
search the database for a data item having the most similar descriptor coordinates to the target position;
display the data item on the display as a member of the search results set; and
repeat the search and display steps until the grid has been populated with the search results set.

* * * * *